(12) United States Patent
Leach

(10) Patent No.: US 8,419,128 B1
(45) Date of Patent: Apr. 16, 2013

(54) CAR SEAT INSERT WITH ELASTIC UNDER-BODY PANEL

(76) Inventor: Jamie S. Leach, Ada, OK (US)

( * ) Notice: Subject to any disclaimer, the term of this patent is extended or adjusted under 35 U.S.C. 154(b) by 1231 days.

(21) Appl. No.: 11/866,630

(22) Filed: Oct. 3, 2007

(51) Int. Cl.
*B60N 2/28* (2006.01)
*A47C 31/00* (2006.01)

(52) U.S. Cl.
USPC .......... 297/219.12; 297/397; 297/464; 5/632; 5/655; 5/637

(58) Field of Classification Search ............. 297/219.12, 297/250.1, 284.9, 397, 464; 5/632, 633, 5/636, 637, 655
See application file for complete search history.

(56) References Cited

U.S. PATENT DOCUMENTS

| | | | |
|---|---|---|---|
| 726,164 A | 6/1900 | Hogan | |
| 2,952,856 A * | 9/1960 | Ruff | 297/391 |
| 3,840,916 A | 10/1974 | Jennings | |
| 4,274,673 A * | 6/1981 | Kifferstein | 297/220 |
| 4,383,713 A | 5/1983 | Roston | |
| 4,434,513 A | 3/1984 | Welch | |
| 4,463,984 A | 8/1984 | Molnar | |
| 4,528,981 A * | 7/1985 | Behar | 5/637 |
| 4,607,402 A | 8/1986 | Pollard | |
| 4,695,092 A | 9/1987 | Hittie | |
| 4,712,258 A | 12/1987 | Eves | |
| 4,834,459 A | 5/1989 | Leach | |
| 4,861,109 A | 8/1989 | Leach | |
| D309,018 S | 7/1990 | Leach | |
| 5,064,245 A * | 11/1991 | Stephens | 297/397 |
| 5,103,514 A | 4/1992 | Leach | |
| 5,165,130 A | 11/1992 | Wendling | |
| 5,178,309 A | 1/1993 | Bicheler et al. | |
| 5,216,772 A | 6/1993 | Clute | |
| 5,228,745 A | 7/1993 | Hazel | |
| 5,310,245 A | 5/1994 | Lyszczasz | |
| 5,325,818 A | 7/1994 | Leach | |
| 5,339,472 A | 8/1994 | Yin | |
| 5,341,531 A | 8/1994 | Straub et al. | |
| 5,359,739 A * | 11/1994 | Rains et al. | 5/81.1 R |
| 5,486,037 A | 1/1996 | Harper | |
| 5,546,620 A | 8/1996 | Matthews | |
| 5,551,109 A | 9/1996 | Tingley et al. | |
| 5,586,351 A | 12/1996 | Ive | |
| 5,826,287 A | 10/1998 | Tandrup | |
| 5,829,829 A | 11/1998 | Celestina-Krevh | |
| 5,916,089 A | 6/1999 | Ive | |
| 5,979,981 A | 11/1999 | Dunne et al. | |
| 5,988,752 A | 11/1999 | Richards | |
| D420,845 S | 2/2000 | Rumage | |
| 6,052,848 A | 4/2000 | Kelly | |
| 6,154,900 A * | 12/2000 | Shaw | 5/81.1 R |

(Continued)

*Primary Examiner* — Peter Brown
(74) *Attorney, Agent, or Firm* — Mary M. Lee

(57) ABSTRACT

An insert for positioning an infant in a car seat. The insert includes a head support section to support the baby's head on both sides. Connected to the head support section is a body support section with elongate side members connected by an elastic under-body support panel extending therebetween. This panel can be sewn to the side members or, even more preferably, can be attached by tubular sleeves that are slidably received on the side members of the body support section. In this way, the position of the panel can be adjusted along the length of the insert. Additionally, by rotating the side members, or the sleeves on the side members, the tension on the panel can be adjusted to increase or decease the tension, as desired, to create a swaddling effect under the infant. Alternately, the insert serves as an infant swing or carrier.

27 Claims, 4 Drawing Sheets

U.S. PATENT DOCUMENTS

| | | |
|---|---|---|
| 6,205,600 B1 | 3/2001 | Sedlack |
| 6,209,962 B1 | 4/2001 | Sobel et al. |
| 6,253,400 B1 | 7/2001 | Rudt-Sturzenegger et al. |
| D446,675 S | 8/2001 | Straub |
| 6,321,403 B1 * | 11/2001 | Matthews .................. 5/655 |
| 6,341,818 B1 | 1/2002 | Verbovszky et al. |
| 6,343,727 B1 | 2/2002 | Leach |
| 6,363,558 B1 | 4/2002 | Dunne |
| 6,427,251 B1 | 8/2002 | Leach |
| 6,467,840 B1 | 10/2002 | Verbovszky et al. |
| 6,499,164 B1 | 12/2002 | Leach |
| 6,499,165 B1 | 12/2002 | Morgillo |
| 6,505,366 B1 | 1/2003 | Lied |
| 6,553,590 B1 | 4/2003 | Leach |
| 6,601,252 B1 | 8/2003 | Leach |
| 6,662,390 B1 | 12/2003 | Berger |
| 6,751,817 B1 | 6/2004 | Leach |
| 6,760,934 B1 | 7/2004 | Leach |
| 6,793,287 B2 | 9/2004 | Dunk |
| 6,814,405 B2 | 11/2004 | Norman |
| 6,817,663 B1 | 11/2004 | Stuart |
| 6,918,631 B2 | 7/2005 | Verbovszky |
| 6,926,359 B2 | 8/2005 | Runk |
| 7,010,821 B1 | 3/2006 | Leach |
| 7,097,243 B2 | 8/2006 | Verbovszky |
| 7,114,206 B2 | 10/2006 | Leach |
| 7,311,357 B2 * | 12/2007 | Gold et al. ............... 297/219.12 |
| 7,353,552 B2 | 4/2008 | Leach |
| 2002/0014793 A1 | 2/2002 | Santha |
| 2005/0278864 A1 | 12/2005 | Leach |
| 2006/0006710 A1 | 1/2006 | Sallus |
| 2006/0031992 A1 | 2/2006 | Moore |
| 2007/0022526 A1 | 2/2007 | Leach |
| 2007/0028384 A1 | 2/2007 | Leach |
| 2007/0029851 A1 | 2/2007 | Nishimoto |
| 2007/0046084 A1 | 3/2007 | Leach |
| 2007/0085391 A1 | 4/2007 | Pines et al. |
| 2007/0085392 A1 | 4/2007 | Friedland et al. |
| 2007/0108810 A1 | 5/2007 | Nishimoto et al. |
| 2007/0151031 A1 | 7/2007 | Leach |
| 2007/0277321 A1 | 12/2007 | Leach |

* cited by examiner

1

CAR SEAT INSERT WITH ELASTIC UNDER-BODY PANEL

FIELD OF THE INVENTION

The present invention relates generally to infant support pillows and cushions for use in infant car seats.

BACKGROUND OF THE INVENTION

Infant car seats are an essential, but expensive travel accessory for parents and caregivers of infants and toddlers. Because of their cost, they are typically sized for use from infancy though 2-3 years of age. However, this means that the seat usually is too spacious for premature or very young infants. A variety of car insert cushions and pillows have been developed to position and support small infants in car seats. However, there remains a need for a car seat insert with added versatility.

The car seat insert of the present invention answers this need by providing a car seat insert cushion that cushions and positions the entire length of the infant's body. The head support section comprises a unitary C-shaped cushion that supports both sides of the head. The body support section includes two elongate side members with an elastic support panel extending therebetween. The tension on the panel can be adjusted by rotating the side members. In a most preferred embodiment, the panel is attached to the side members by sleeves so that the position of the panel along the length of the insert can be adjusted.

DETAILED DESCRIPTION OF THE PREFERRED EMBODIMENTS

Figure 1:
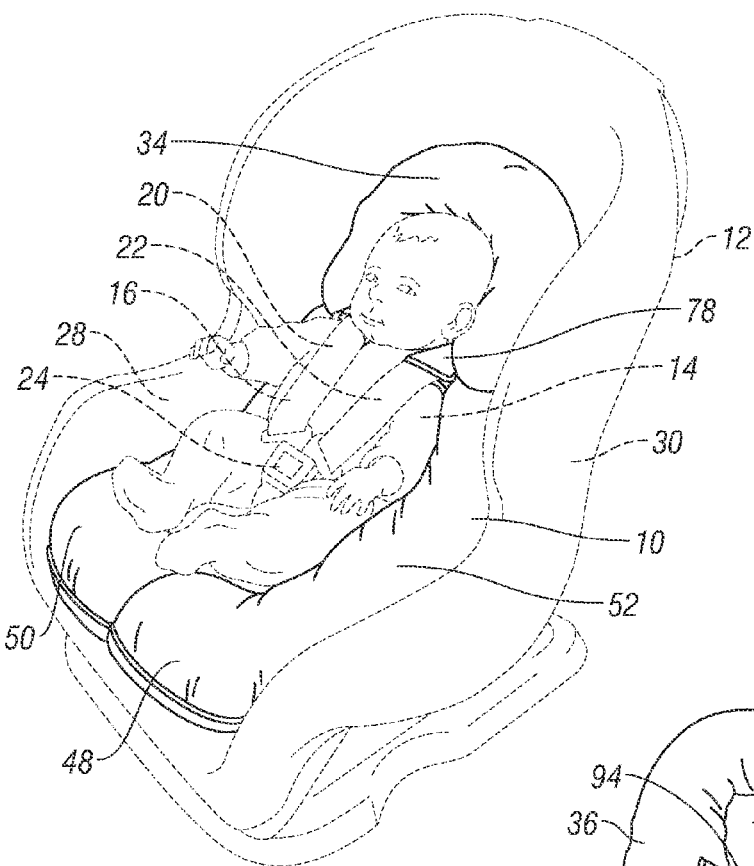
FIG. 1 is a perspective view of an infant secured in a conventional car seat, both shown in broken lines, using the car seat insert of the present invention.

Turning now to the drawings in general and to FIG. 1 in particular, shown therein is a car seat insert made in accordance with a preferred embodiment of the present invention and designated generally by the reference numeral 10. The car seat insert 10 is shown inside a conventional car seat 12, shown in broken lines, with an infant 14, also in broken lines, secured therein by a harness 16. Typically, the harness 16 comprises two shoulder straps 20 and 22 that extend generally from the back of the car seat 12 downwardly over the shoulders and torso of the infant 14 and connecting by a clamp or buckle 24 to the lower body portion of the harness. The car seat 12 shown in the drawings is merely exemplary of many commercially available car seats. The car seat 12 may vary in style and configuration, but typically will include forwardly extending sides 28 and 30 for partially enclosing the infant 14.

Figure 2:
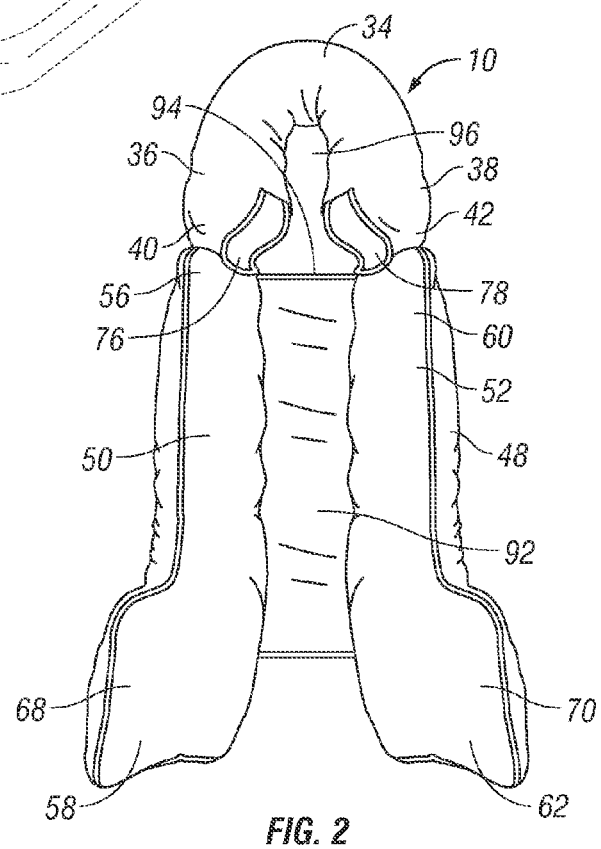
FIG. 2 is a front perspective view of the car seat insert.

As shown in FIG. 2, the car seat insert 10 comprises a head support section 34 that is generally C-shaped, though the shape may vary. The head support section 34 should at least comprise side members 36 and 38 for supporting the sides of the infant's head in the car seat 12. Each side member 36 and 38 has an end 40 and 42 configured to be adjacent to the shoulder of the infant 14 when the infant and the insert 10 are secured in the car seat 12 (FIG. 1).

The insert 10 preferably also comprises a body support section 48 connected to the head support section 34. The body support section comprises a pair of spaced apart, elongated side members 50 and 52. Each of the side members 50 and 52 is sized to be received between one side of the infant 14 and the adjacent side of the car seat 12. Specifically, the side member 50 is dimensioned to be received between the infant's right side and the side 28 of the seat 12, and the side member 52 is dimensioned to be received between the infant's left side and the side 30 of the seat.

Each of the side members 50 and 52 has an upper and lower end, that is, the side member 50 has an upper end 56 and a lower end 58, and the side member 52 has an upper end 60 and a lower end 62. Preferably the upper ends 56 and 58 are attached to the ends 40 and 42, respectively, of the head support section 34. Most preferably, this connection takes the form of a seam or joint, although the connection can be a continuous transition from the head support section 34 to the side members 50 and 52. In addition, the lower ends 58 and 60 may each include an outwardly projecting foot 68 and 70, respectively. When rotated inwardly towards each other, as shown in FIG. 1, these form a complete bolster around the infant 14.

The head support section 34 and the body support section 48 may be formed of compressible, resilient material so that the insert 10 provides good cushioning and returns to its original shape or resting position after being deformed. The insert 10 may be formed in any suitable manner. In the preferred technique, the insert 10 is formed by first sewing a fabric enclosure (not shown) in the desired configuration. The enclosure material may be any suitable fabric, including but not limited to waterproof nylon, flannel, or elastic fabrics, such as spandex or cotton-spandex blends. However, presently a polyester/cotton blend is preferred. The enclosure may be filled with a compressible, resilient material. A preferred filler is polyester fiberfill. Other suitable fillers include down feathers, memory foam, and polystyrene pellets. In some instances, an inflatable inner liner may be preferred.

Figure 3:
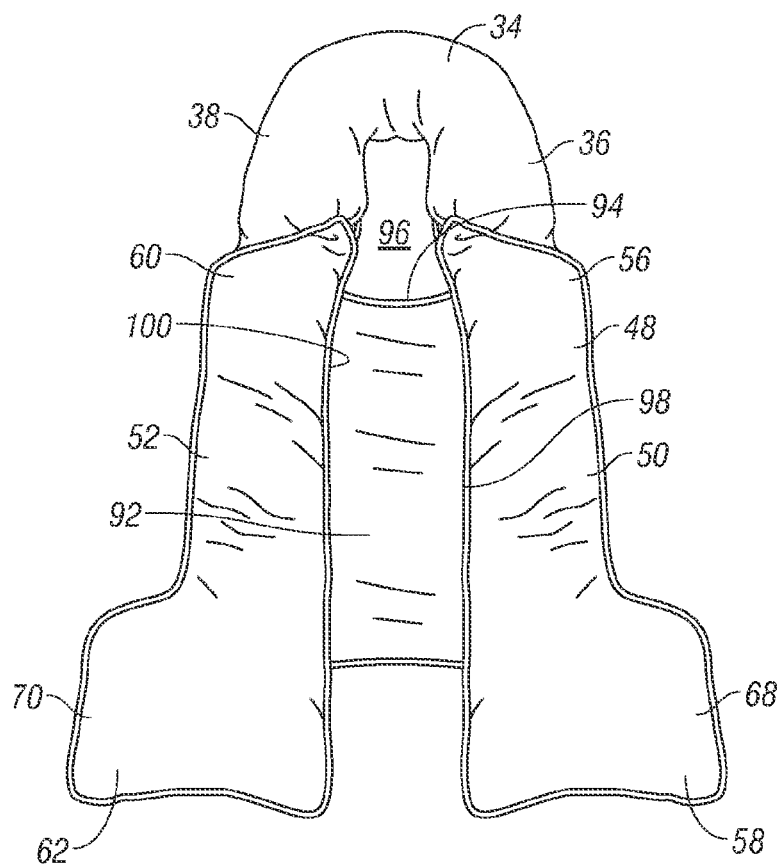
FIG. 3 is a rear perspective view of the car seat insert shown in FIG. 2.
Figure 4:
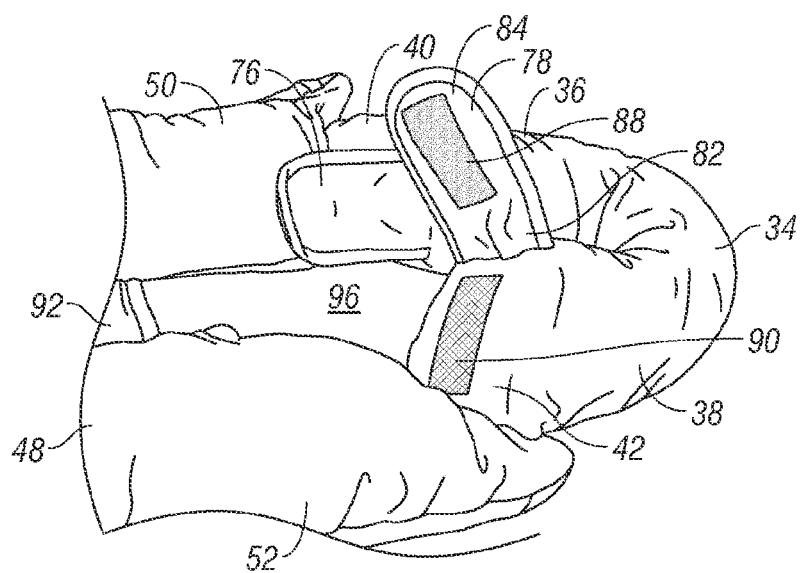
FIG. 4 is an enlarged fragmented side perspective view of the upper portion of the car seat insert illustrating the shoulder tabs that secure the insert to the car seat harness straps.

Referring still to FIGS. 1-3 and now also to FIG. 4, the insert 10 preferably includes a pair of loops, such as the tabs 76 and 78, attached to the insert. Each of the tabs 76 and 78 is positioned and sized to slidably receive one of the two shoulder straps 20 and 22 of the harness 16 in the car seat 12, as shown in FIG. 1. In this way, the bolster formed by the insert 10 is held snugly around the infant 14.

Referring particularly to FIG. 4, one of the tabs 78 will be described in more detail. The tab 78 has one end 82 attached to the insert, preferably to the end 42 of the head support section 34, and a second end 84 that is removably attachable to the insert, again preferably to the end of the head support section. Mating hook-and-loop fasteners are provided on the tab 78. Specifically, as shown in FIG. 4, hook-and-loop fastener 88 is provided on the end 84 of the tab 78, and fastener 90 is attached to the end 42 of the head support section 34, the fastener 90 positioned to mate with the fastener 88. It will be understood that the tab 76 has similar fasteners. While hook-and-loop type fasteners are ideal for the preferred embodiment shown herein, other types of connectors may be substituted. For example, the attachment means could be drawstrings, buttons, ties, snaps, hooks, buckles, or the like.

With continued reference to FIGS. 2-4, the insert 10 preferably further comprises an under-body panel 92 extending between the side members 50 and 52. In the preferred embodiments, the panel 92 is an elastic fabric, such as spandex, however other fabrics may be substituted. The panel 92 preferably has an upper edge 94 that, with the head support section 34, forms an opening 96 behind the head of the infant when the infant and the insert 10 are secured in the car seat. The shoulder straps 20 and 22 of the harness 26 may be accessed through this opening 96.

The under-body panel 92 has a first side edge 98 and a second side edge 100 (FIG. 3), the side edge 98 being attached along the length of the side member 50, and the second side edge 100 being attached along the length of the side member 52. In this way, when the side members 50 and 52 are rotated inwardly, the panel 92 will be stretched apart, and when the side members are rotated outwardly, the panel will be relaxed. In other words, the tension on the panel 92 can be increased or decreased by rotation of the side members 50 and 52 of the body support section 48. This creates a swaddling effect, especially for the smaller infants.

Figure 5:
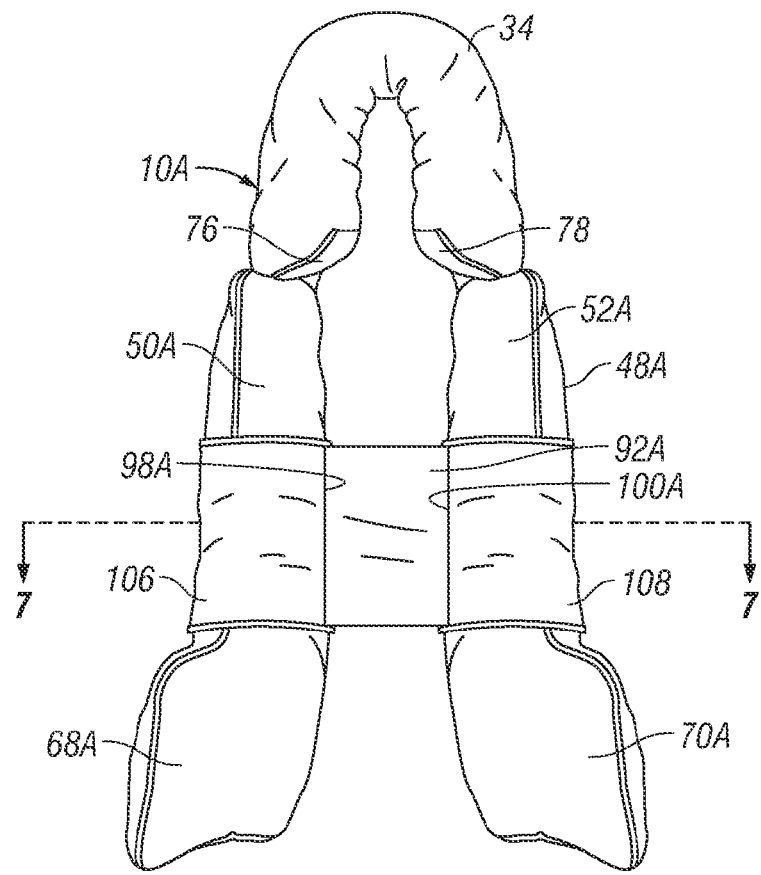
FIG. 5 is a front perspective view of a second embodiment of the car seat insert of the present invention in which the under-body panel is removable and adjustable.
Figure 6:
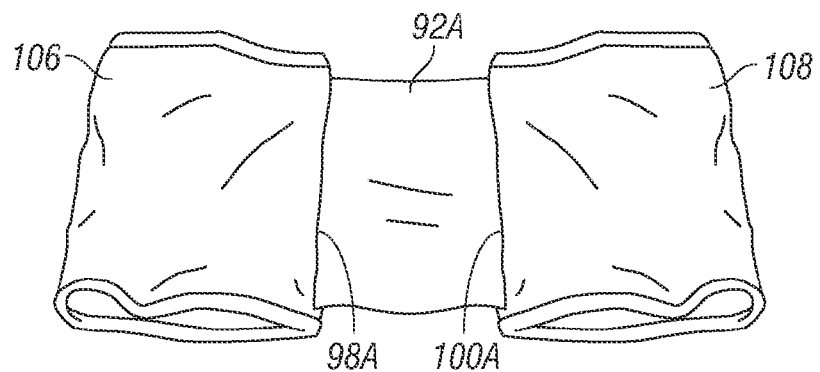
FIG. 6 is an enlarged frontal perspective view of the under-body panel of the car seat insert shown in FIG. 6.

Turning now to FIGS. 5 and 6, a second embodiment of the car seat insert of the present invention will be described. In this embodiment the insert, designated generally by the reference numeral 10A, comprises a similarly formed head support section 34 with tabs 76 and 78, and a body support section 48A comprising side members 50A and 52A with feet 68A and 70A. An under-body panel 92A also is included. However, in this embodiment, the side edges 98A and 100A are attached along the length of each one of a pair of tubular sleeves 106 and 108 that are slidably receivable on the side members 50A and 52A of the body support section 48. The sleeves 106 and 108, like the panel 92A, are made of fabric, and most preferably of the same elastic fabric as the panel.

Now it will be apparent that the sleeves 106 and 108 easily can be slipped on and off the side members 50A and 52A of the body support section 48. In this way, the position of the under-body panel 92A can be moved upwardly and downwardly on the body support section 48.

Figure 7:
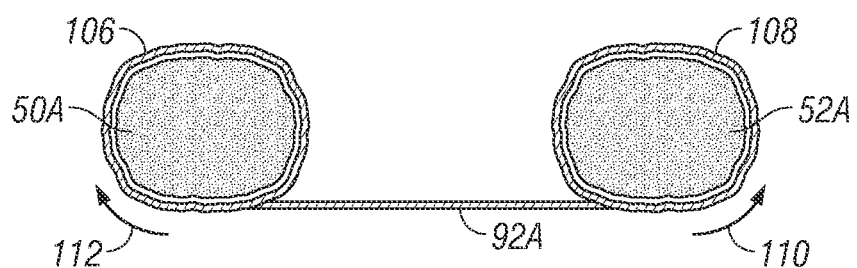
FIG. 7 is sectional view taken along line 7-7 of FIG. 5 showing the under-body panel positioned at the rear of the arms.
Figure 8:
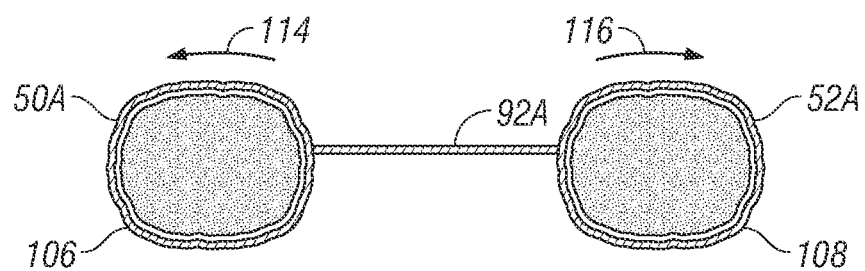
FIG. 8 is a sectional view of the under-body panel positioned near the front of the arms.

With reference now to FIGS. 7 and 8, the adjustable tension feature of the panel 92A is illustrated. FIG. 7 shows the panel 92A in a relaxed position, in which the panel will lie flat against the back of the car seat 12. By rotating the sleeves 106 and 108 in the direction of the arrows 110 and 112, the tension on the panel 92A can be increased, while maintaining the panel 92A in a rearward position. As shown in FIG. 8, when the sleeves 106 and 108 are rotated in the direction of the arrows 114 and 116, the tension on the panel 92A can be increased while at the same time lifting the panel to a more forward position. This allows the tension on the under-body panel 92A to be adjusted independent of the position of the side members 50A and 52A. Thus, the feet 68A and 70A can rotated inwardly to support the infant's feet and legs, as shown in FIG. 1, while the under-body panel 92A is lifted, as in FIG. 8.

Now it will be appreciated that the car insert of the present invention provides an ideal way to position a small infant snugly in a standard sized car seat. The shoulder loops keep the insert close to the infant's body, and the under-body panel hugs the infant's back and bottom in a bucket-like manner, which can be adjusted for the size of the infant. It will also be apparent that the car insert can be used in other ways apart from a car seat. For example, the because of its "bucket" seat, the insert may be used as a swing or an infant carrier.

The embodiments shown and described above are exemplary. Many details are often found in the art and, therefore, many such details are neither shown nor described. It is not claimed that all of the details, parts, elements, or steps described and shown were invented herein. Even though numerous characteristics and advantages of the present inventions have been described in the drawings and accompanying text, the description is illustrative only. Changes may be made in the details, especially in matters of shape, size, and arrangement of the parts within the principles of the invention to the full extent indicated by the broad meaning of the terms of the attached claims. The description and drawings of the specific embodiments herein do not point out what an infringement of this patent would be, but rather provide an example of how to use and make the invention. The limits of the invention and the bounds of the patent protection are measured by and defined in the following claims.

What is claimed is:

1. A car seat insert for supporting an infant in a car seat, the car seat comprising forwardly extending sides and a harness comprising two shoulder straps that extend generally from the back of the car seat downwardly over the shoulders and torso of the infant, the insert comprising:
    a head support section having side members for supporting the sides of the infant's head in the car seat, each side member having an end configured to be adjacent to the shoulder of the infant when the infant and the insert are secured in the car seat, and wherein the head support section defines a opening behind the infant's head when the infant and the insert are secured in the car seat and through which the shoulder straps of the car seat harness are accessible;
    a body support section connected to the head support section, the body support section comprising a pair of spaced apart, elongated side members, each sized to be received between the side of the infant and the adjacent side of the car seat, and each having an upper end attached to the end of one of the side members of the head support section;
    wherein the head support section and the side members of the body support section comprise compressible, shape sustaining material;
    a pair of loops attached to the insert, each of the loops positioned and sized to slidably receive one of the two shoulder straps on the car seat harness.

2. The car seat insert of claim 1 wherein the head support section comprises a unitary U-shaped cushion.

3. The car seat insert of claim 1 wherein each of the loops comprises a tab having one end attached to the insert and a second end that is that is removably attachable to the insert.

4. The car seat insert of claim 3 wherein each of the tabs is attached to a different one of the side members of the head support section.

5. A car seat assembly comprising a car seat and the car seat insert of claim 3.

6. A car seat assembly comprising a car seat and the car seat insert of claim 1.

7. A car seat insert for supporting an infant in a car seat, the car seat comprising forwardly extending sides and a harness comprising two shoulder straps that extend generally from the back of the car seat downwardly over the shoulders and torso of the infant, the insert comprising:
    a head support section having side members for supporting the sides of the infant's head in the car seat; and a body support section comprising:
  a pair of spaced apart, elongate and generally parallel side members, each sized to be received between one side of the infant and the adjacent side of the car seat, and each having an upper and a lower end; and
  an elastic under-body panel disposed between the side members and having an upper edge that, with the head support section, forms an opening behind the head of the infant when the infant and the insert are secured in the car seat and through which the shoulder straps of the car seat harness are accessible, the under-body panel also having two elongate side edges, each side edge secured along the length of a different one of the side members of the body support section so that the side edge can be pulled into a position in front of or behind the side member increasing tension on the under-body panel or, alternately, moved to a position along the inside of the side member reducing the tension on the under-body panel, whereby the tension on the under-body panel is adjustable;
wherein the head and body support sections comprise compressible, shape sustaining material.

8. The car seat insert of claim 7 wherein each side edge is attached along the length of a different one of the side members of the body support section, so that rotation of the side members changes the tension on the support panel suspended there between.

9. The car seat insert of claim 8 further comprising a pair of loops attached to the insert, each of the loops positioned and sized to slidably receive one of the two shoulder straps on the car seat harness.

10. The car seat insert of claim 9 wherein each of the loops comprises a tab having one end attached to the insert and a second end that is that is removably attachable to the insert.

11. The car seat insert of claim 10 wherein each of the tabs is attached to a different one of the side members of the head support section.

12. A car seat assembly comprising a car seat and the car seat insert of claim 9.

13. The car seat insert of claim 8 wherein each of the side members of the body support section includes an foot extending outwardly from its lower end.

14. A car seat assembly comprising a car seat and the car seat insert of claim 8.

15. The car seat insert of claim 7 wherein the body support section further comprises a pair of elongate tubular sleeves, each slidably receivable on one of the side members of the body support section, and wherein each of the two elongate side edges is attached along the length of a different one of the sleeves so that rotation of the sleeves on side members of the body support section changes the tension on the support panel suspended there between.

16. The car seat insert of claim 15 further comprising a pair of loops attached to the insert, each of the loops positioned and sized to slidably receive one of the two shoulder straps on the car seat harness.

17. A car seat assembly comprising a car seat and the car seat insert of claim 16.

18. The car seat insert of claim 15 wherein each of the loops comprises a tab having one end attached to the insert and a second end that is that is removably attachable to the insert.

19. The car seat insert of claim 18 wherein each of the tabs is attached to a different one of the side members of the head support section.

20. The car seat insert of claim 15 wherein each of the side members of the body support section includes an foot extending outwardly from its lower end.

21. A car seat assembly comprising a car seat and the car seat insert of claim 15.

22. A method for positioning an infant in a car seat, the car seat comprising forwardly extending sides and a harness comprising two shoulder straps that extend generally from the back of the car seat downwardly over the shoulders and torso of the infant, the method comprising:
  placing a car seat insert in the car seat, the car seat insert comprising:
    a head support section having side members for supporting the sides of the infant's head in the car seat; and
    a body support section comprising:
      a pair of spaced apart, elongate and generally parallel side members, each sized to be received between one side of the infant and the adjacent side of the car seat, and each having an upper and a lower end; and
      an elastic under-body panel disposed between the side members and having an upper edge that, with the head support section, forms an opening behind the head of the infant when the infant and the insert are secured in the car seat and through which the shoulder straps of the car seat harness are accessible, the under-body panel also having two elongate side edges, each side edge secured along the length of a different one of the side members of the body support section so that the side edge can be pulled into a position in front of or behind the side member increasing tension on the under-body panel or, alternately, moved to a position along the inside of the side member reducing the tension on the under-body panel, whereby the tension on the under-body panel is adjustable;
    wherein the head and body support sections comprise compressible, shape sustaining material;
  placing the infant in the insert; and
  adjusting the tension on the under-body panel.

23. The method of claim 22 wherein the body support section further comprises a pair of elongate tubular sleeves, each slidably receivable on one of the side members of the body support section, and wherein each of the two elongate side edges is attached along the length of a different one of the sleeves so that rotation of the sleeves on side members of the body support section changes the tension on the support panel suspended there between.

24. The method of claim 23 further comprising a pair of loops attached to the insert, each of the loops positioned and sized to slidably receive one of the two shoulder straps on the car seat harness.

25. The method of claim 23 wherein each of the loops comprises a tab having one end attached to the insert and a second end that is that is removably attachable to the insert.

26. The method of claim 25 wherein each of the tabs is attached to a different one of the side members of the head support section.

27. The method of claim 23 wherein each of the side members of the body support section includes an foot extending outwardly from its lower end.

\* \* \* \* \*